(12) United States Patent
Eales (10) Patent No.: US 9,188,431 B2
(45) Date of Patent: Nov. 17, 2015

(54) BACKLIT VISION MACHINE

(75) Inventor: Marcus James Eales, Stroud (GB)

(73) Assignee: RENISHAW PLC, Wotton-under-Edge (GB)

( * ) Notice: Subject to any disclaimer, the term of this patent is extended or adjusted under 35 U.S.C. 154(b) by 312 days.

(21) Appl. No.: 13/122,460

(22) PCT Filed: Oct. 9, 2009

(86) PCT No.: PCT/GB2009/002430
§ 371 (c)(1),
(2), (4) Date: Apr. 4, 2011

(87) PCT Pub. No.: WO2010/041036
PCT Pub. Date: Apr. 15, 2010

(65) Prior Publication Data
US 2011/0181715 A1    Jul. 28, 2011

(30) Foreign Application Priority Data

Oct. 10, 2008  (GB) .................................. 0818625.6

(51) Int. Cl.
*H04N 7/18*   (2006.01)
*G01B 11/24*  (2006.01)

(52) U.S. Cl.
CPC .................................. *G01B 11/2433* (2013.01)

(58) Field of Classification Search
None
See application file for complete search history.

(56) References Cited

U.S. PATENT DOCUMENTS

| | | | |
|---|---|---|---|
| 3,243,626 A * | 3/1966 | Helvy et al. ................... | 313/535 |
| 4,053,863 A * | 10/1977 | Marlor ............................ | 430/87 |
| 4,692,690 A | 9/1987 | Hara et al. | |
| 4,816,686 A | 3/1989 | Hara et al. | |
| 4,872,757 A | 10/1989 | Cormack et al. | |
| 5,039,868 A | 8/1991 | Kobayashi et al. | |
| 2006/0185550 A1 | 8/2006 | Zanzucchi et al. | |
| 2007/0286969 A1 * | 12/2007 | Nagpal et al. ................ | 428/1.31 |

(Continued)

FOREIGN PATENT DOCUMENTS

| | | |
|---|---|---|
| CN | 1603740 A | 4/2005 |
| EP | 0 236 738 A2 | 9/1987 |

(Continued)

OTHER PUBLICATIONS

British Search Report dated Feb. 9, 2009 in corresponding British Patent Application No. 0818625.6.

(Continued)

*Primary Examiner* — Kate Luo
(74) *Attorney, Agent, or Firm* — Oliff PLC (57) ABSTRACT

A back-lit vision machine apparatus is described that includes an imaging sensor for imaging an object. A radiation source for generating radiation having a first property and a radiation converter for converting radiation having the first property into radiation having a second property are also provided. The radiation source is arranged to project radiation having the first property onto the radiation converter thereby producing radiation having the second property, while the radiation converter is arranged to illuminate an object to be imaged by the imaging sensor with radiation having the second property. An object to be imaged is locatable between the radiation converter and the imaging sensor and such an object is thus back-lit by radiation having the second property produced by the radiation converter. The radiation source is arranged to project radiation having the first property onto the object to be imaged and onto the radiation converter.

18 Claims, 4 Drawing Sheets

(56) References Cited

U.S. PATENT DOCUMENTS

2008/0006102 A1* 1/2008 Engelbart et al. ............... 73/866
2008/0164316 A1* 7/2008 Patel et al. ............... 235/462.43

FOREIGN PATENT DOCUMENTS

| JP | A-63-148151 | 6/1988 |
| JP | A-63-148152 | 6/1988 |
| JP | A-02-044203 | 2/1990 |
| JP | H09-68497 A | 3/1997 |
| JP | 2000-113191 A | 4/2000 |
| JP | A-2004-045317 | 2/2004 |
| JP | A-2004-340847 | 12/2004 |
| JP | A-2005-188955 | 7/2005 |
| JP | 2006-234553 A | 9/2006 |
| WO | WO 92/07234 A1 | 4/1992 |

OTHER PUBLICATIONS

Written Opinion of the International Searching Authority dated Feb. 4, 2010 in corresponding International Application No. PCT/GB2009/002430.

International Search Report dated Feb. 4, 2010 in corresponding International Application No. PCT/GB2009/002430.

Office Action for Chinese Patent Application No. 200980140315.3 dated Jul. 16, 2012 (with English translation).

Sep. 10, 2013 Official Notice of Rejection issued in Japanese Patent Application No. 2011-530560 (with translation).

Aug. 19, 2014 Office Action issued in Japanese Patent Application No. 2011-530560.

Jun. 2, 2015 Office Action issued in Japanese Application No. 2011-530560.

* cited by examiner

BACKLIT VISION MACHINE

The present invention relates to a vision machine, and in particular to a vision machine that uses back lighting to detect the edge profile of an object.

Vision machine systems for inspecting the surface profiles of objects are known. A typical vision machine comprises an imaging camera affixed to the moveable quill of a co-ordinate measuring machine (CMM). The CMM can then accurately control movement of the imaging camera relative to an object placed on the bed of the CMM thereby allowing images of the object to be acquired. Analysis of such images of the object using appropriate software allows the surface or edge features of the object to be measured.

It is known to acquire images of objects using vision machine systems that employ front-lighting or back-lighting. If the edge profile of an object is required, it is preferred to use a back-lit vision machine system to prevent reflections from the object introducing errors into the edge detection analysis process. It is known to provide the necessary back lighting in a number of ways. For smaller machines, the bed of the CMM may simply comprise a sheet of glass on which objects can be placed. A light source placed under the sheet of glass is then used to illuminate objects from behind. If larger machines (e.g. several meters across) need to be used and/or heavier objects (e.g. engine blocks) are to be measured, the thickness of glass required to ensure mechanical stability can increase significantly. For such large machines, it also becomes impractical to illuminate across the entire machine bed at the same time. In such instances, it is known to move a collimated light source underneath the glass in synchronisation with the quill of the CMM that carries the video camera. Such arrangements are cumbersome and greatly add to the cost of larger vision machine systems.

In the field of contour shape inspection, the use of a rear illuminated fluorescent screen has also been proposed previously; e.g. see JP2004-340847. It has also been described in the field of circuit board manufacture to add fluorescent agents to selected parts of a circuit board structure to allow the inspection of solder patterns; e.g. see U.S. Pat. No. 5,039,868, U.S. Pat. No. 4,816,686 and U.S. Pat. No. 4,692,690.

According to a first aspect of the present invention, vision machine apparatus comprises an imaging sensor for imaging an object, a radiation source for generating radiation having a first property, and a radiation converter for converting radiation having the first property into radiation having a second property; the radiation source being arranged to project radiation having the first property onto the radiation converter thereby producing radiation having the second property, the radiation converter being arranged to illuminate an object to be imaged by the imaging sensor with radiation having the second property, wherein an object to be imaged is locatable between the radiation converter and the imaging sensor, such an object thus being back-lit by radiation having the second property produced by the radiation converter, wherein the radiation source is arranged to project radiation having the first property onto the object to be imaged and onto the radiation converter.

The present invention thus provides a back-lit or profile illuminating vision machine having an imaging sensor for imaging an object, such as a workpiece, that is to be measured. The imaging sensor, as outlined in more detail below, may comprise a colour camera system of known type. A radiation source is also provided for generating radiation having a first property and, in use, such radiation is projected (e.g. focussed) onto an object to be imaged and also onto a radiation converter that converts at least some of that radiation into radiation having a second (different) property. The radiation having the second property that is produced by the radiation converter thus illuminates an object being viewed by the imaging sensor from the rear. Providing a backlighting arrangement of this type is particularly useful when performing edge detection processing on images of objects acquired by the imaging sensor.

In a preferred embodiment described below, the radiation source comprises an ultraviolet (UV) light source that outputs light having a wavelength or a spread of wavelengths in the UV region of the spectrum. The radiation converter may then comprise a fluorescent material that absorbs such UV light and fluoresces thereby producing blue light. In such an example, the radiation converter performs the function of converting UV light into longer wavelength light in the blue (visible) region of the spectrum. In this example, radiation having a first property can be seen to comprise light having a certain spectra in the UV wavelength range whereas radiation having a second property comprises light having a certain spectra in the (visible) blue wavelength range. The (visible) blue light generated by the fluorescent material illuminates, from behind, the object to be imaged by the imaging sensor.

As outlined above, the radiation converter forms part of the vision machine apparatus for imaging objects. Preferably, the radiation converter is separate to the object being imaged; i.e. the radiation converter is preferably not attached to, or in any way integrated with, the object being imaged. Advantageously, the radiation converter is spaced apart from the object being imaged. For example, the radiation converter is preferably located a certain distance behind the object to be imaged.

The present invention offers the benefit over prior art vision systems of the type described above that the radiation source does not need to be placed behind the object to be illumination. Instead, a radiation converter (e.g. a sheet of fluorescent material) can be placed in a location that allows rear or profile illumination of the object, whilst the radiation source is located remotely. In particular, backlighting an object in accordance with the present invention requires that only the radiation converter is placed behind the object; the radiation source itself may be located away from the object (e.g. in front of the object, optionally at or near the imaging sensor) and arranged to project light onto the radiation converter. The present invention can be seen to be particularly beneficial for implementing backlighting on a CMM; instead of having to provide a complex backlighting arrangement, such as providing a CMM table that incorporates an appropriate light source, it is only necessary to incorporate the radiation converter (e.g. a sheet of fluorescent material) into the CMM table. The present invention thus simplifies the structure, thereby reducing the cost, of vision machines.

Any convenient spatial relationship may be provided between the radiation source and the radiation converter. The radiation source may, for example, illuminate the radiation converter, or a part thereof, at an oblique angle or from the side. The relative spatial position between the radiation source and the radiation converter may be fixed or variable in use. As outlined above, the radiation source is arranged to project radiation having the first property onto both an object to be imaged and the radiation converter to provide backlighting of the object. For example, an object to be imaged may be locatable between the radiation source and the radiation converter. Radiation having the first property may then illuminate the front of the object (i.e. the part of the object visible to the imaging sensor) and also fall onto a region of the radiation converter. Although the object will cast a shadow on the radiation converter in such an arrangement, radiation having the second property will be generated by the surrounding regions of the radiation converter and provide backlighting of the object.

Preferably, the radiation converter has a first face. Radiation from the radiation source is advantageously incident on the first face. Radiation having the second property emitted from the first face is preferably arranged to illuminate the object to be imaged. It is thus preferred that radiation is incident upon the same face of the radiation converter from which the radiation for illuminating the object is emitted. Advantageously, the radiation converter is substantially planar and has first planar surface that receives radiation having the first property and emits radiation having the second property.

It should be noted that illuminating the object and radiation converter means that not all of the radiation having the first property reaches the radiation converter (e.g. some may be reflected directly from the object being imaged). Also, the radiation converter may not provide complete conversion; e.g. some radiation having the first property may simply be reflected from the radiation converter. A filter is thus preferably provided to substantially prevent radiation having the first property from reaching the imaging sensor. The filter may, for example, be attached to a lens of the imaging sensor or provided somewhere within the imaging system of the imaging sensor. The filter preferably allows radiation having the second property to reach the imaging sensor. The filter may be reflective or transmissive. A software based filter may also or alternatively be used.

If the radiation having the first property comprises radiation of a different wavelength to the radiation having the second property, the filter may comprise a wavelength selective filter. The filter may comprise a wavelength cut-off filter that only passes radiation above a selected cut-off wavelength; in this example, the wavelength of the radiation having the first property may fall below the selected cut-off wavelength. The filter may alternatively block radiation within a certain wavelength band that coincides with the wavelength or wavelength range of radiation having the first property. Alternatively, the filter may allow passage to the imaging sensor of radiation within a certain wavelength band that coincides with the wavelength or wavelength range of radiation having the second property. The filter may, for an optical system, comprise an optical filter.

The radiation source may comprise a light source. The light source may comprise one or more light emitters. Preferably, the radiation source comprises an ultraviolet radiation source, such as one or more ultraviolet light emitting diodes. Conveniently, the radiation source comprises a plurality of light emitting diodes arranged in a ring. The imaging sensor may then be located at or near the centre of the ring. In addition to the radiation source that provides the radiation having the first property, further radiation sources may be provided. For example, visible (e.g. white) LEDs may also be provided as an alternative illumination source (e.g. of visible light). If a further radiation source is provided, it may be arranged to produce radiation having a third property which can be distinguished from radiation of the first and second properties.

Advantageously, the radiation converter comprises fluorescent material, the radiation converter thereby converting light having a first wavelength property into light having a second wavelength property. For example, the radiation converter may convert UV light into longer wavelength blue light. Although fluorescence is preferred, other radiation conversion mechanisms may be employed. For example, the radiation converter may comprise phosphorescent material. The radiation converter may also convert radiation of one type (e.g. x-rays) into radiation of another type (e.g. light).

The radiation converter may comprise a layer (e.g. a layer of paint) or a sheet that comprises the fluorescent material. Advantageously, the radiation converter comprises a sheet of paper comprising fluorescent material. In particular, a high quality white paper (e.g. printers paper) is preferred that contains high levels of so-called optical brightening agents that provide the fluorescence effect. These agents are commonly added to paper to enhance its appearance providing a perceived whitening effect. Such optical brightening agents typically absorb light in the ultraviolet region of the spectrum (e.g. within the 340-370 nm wavelength range) and re-emit light in the blue regions (e.g. within the 420-470 nm wavelength range). The basic class types of optical brightening agents in common commercial use include Triazine-stilbenes (di-, tetra- or hexa-sulfonated), Coumarins, Imidazolines Diazoles, Triazoles, Benzoxazolines and Biphenyl-stilbenes. The most common class of chemicals that are commercially added to paper as optical brightening agents are the stilbenes.

The vision machine apparatus of the present invention may take any suitable form. For example, the vision machine apparatus may comprise a tool setter (e.g. a device for analysing or detecting tools on machine tools or the like). The apparatus preferably comprises a co-ordinate positioning machine having a quill that is moveable relative to an object supporting base. The imaging sensor and radiation source are conveniently both carried by the quill. As outlined above, the radiation source may comprise a ring of LEDs located around the imaging sensor. The co-ordinate positioning machine may comprise a co-ordinate measuring machine (CMM) or a machine tool. The co-ordinate positioning machine may be a linear (bridge-type) arrangement in which quill movement is provided by serial movement along three (e.g. X, Y, Z) Cartesian axes. Alternatively, the co-ordinate positioning machine may have a parallel or non-Cartesian (e.g. hexapod) configuration.

Advantageously, the radiation source is arranged to project radiation having the first property onto at least the portion of the object supporting base that is within the field of view of the imaging sensor. In other words, the region in which radiation is projected by the radiation source preferably coincides with the region that is viewed by the imaging sensor as the quill is moved relative to the object supporting base. The radiation may be projected over a wider area than the region viewed by the imaging sensor.

As mentioned above, the apparatus may include a co-ordinate positioning machine having an object supporting base. Advantageously, the radiation converter is located at the object supporting base. For example, a radiation converter in the form of a sheet of paper comprising fluorescent material may be placed on at least part of the object supporting base. The radiation converter may cover all, or only some, of the object supporting base. If the co-ordinate positioning machine comprises a quill that carries the radiation source, the radiation converter is preferably provided across the active area of the object supporting base upon which an object may be placed. In such an example, the radiation source may illuminate only a part or sub-region of the active area of the object supporting base (and hence only part of the radiation converter) at any one time. In other words, only the region of the radiation converter from which radiation is to be produced is illuminated and such a region may move with movement of the quill. Providing only the passive radiation converter at the base instead of an active light source reduces heating of the base thereby reducing measurement inaccuracies induced by thermal expansion effects.

The radiation converter (e.g. a sheet of fluorescent paper) may be placed on top of the object supporting base. Advantageously, the object supporting base comprises a member (e.g. a glass member) that is preferably substantially transparent to radiation having the first and second properties. The member (e.g. a glass member) may have an upper surface and a lower surface, the upper surface being arranged to support an object to be imaged. The radiation converter may then be located below the upper surface; e.g. the radiation converter may be located adjacent the lower surface of the member. Radiation having the first property may then pass through the member to the radiation converter whereupon it is converted into radiation having the second property and directed back though the member. In this manner, the object placed on the member can be backlit by radiation having the second property generated by the radiation converter.

The member (e.g. the glass member) provided at the object supporting base is preferably at least 0.5 cm thick, more preferably at least 1 cm thick and more preferably at least 2 cm thick. Providing a member of such a thickness spaces the radiation converter from the object thereby improving the backlighting of the object due to divergence of the radiation of the first property as it passes through the member to the radiation converter. Advantageously, the member (e.g. a glass member) comprises a diffuser layer. For example, a glass member may be provided that comprises two sheets of glass that sandwich a diffusing layer. Such an arrangement improves the distribution of radiation of the second property that is directed by the radiation converter towards an object to be imaged.

Preferably, the object supporting base comprises a rigid base plate (e.g. a metal plate or piece of granite) for supporting the (e.g. glass) member. The radiation converter may then be sandwiched between the rigid base plate and the glass member. In such an arrangement, the glass member is supported across its width and not merely at its edges. The required glass thickness for a given object weight and object supporting base area can thus be substantially reduced compared with edge supported glass bases of known type that incorporate backlighting arrangements.

The imaging sensor may be of any known type. For example, the imaging sensor may comprise a CCD or CMOS camera. Advantageously, the imaging sensor comprises a colour (red-green-blue or RGB) camera.

In a preferred embodiment, the apparatus comprises an image processor for analysing the images produced by the colour camera. The image processor is conveniently arranged to electronically reduce the contribution to the images of ambient light. For example, the radiation of the second property that is produced by the radiation converter may have a wavelength range that allows it to be detected by only one set of the colour sub-pixels of the camera. For example, blue light may be generated by the radiation converter that is only detectable by the blue (B) colour sub-pixels of the camera. Ambient light is, however, typically broadband in nature and is thereby detected in approximately equal intensities by the red, green and blue (R, G, B) sub-pixels of the camera. The effects of ambient light can thus be reduced by subtracting the sum of half of each of the intensities detected by the green and red sub-pixels from the intensity of light detected by the blue sub-pixel. This may be done on a pixel by pixel basis across the imaging array of the camera thereby producing an intensity map that may be viewed as a black and white or corrected image.

The apparatus may comprise an edge detection analyser for receiving images from the imaging sensor. In particular, the received images may be corrected images of the type described above. The edge detection analyser is conveniently arranged to detect the position of any object edges in the received images. Software suitable for such edge detection is known.

According to a second aspect of the invention, a co-ordinate positioning machine is provided that comprises; an object supporting base comprising a radiation converter for converting radiation having a first property into radiation having a second property; a quill that is moveable relative to the object supporting base, the quill carrying an imaging sensor for imaging an object located on the object supporting base; and a radiation source for generating radiation having a first property; wherein the radiation source is arranged to project radiation having the first property onto the radiation converter, the radiation converter thereby producing radiation having the second property for illuminating an object located on the object supporting base. Preferably, the radiation source is carried by the quill, an object located on the object supporting base thereby being back-lit by radiation having the second property produced by the radiation converter. The co-ordinate positioning machine may also include any one or more of the features of the apparatus according to the first aspect of the invention.

According to a third aspect of the invention, vision machine apparatus is provided that comprises an imaging sensor for imaging an object, a radiation source for generating radiation having a first property, a radiation converter for converting radiation having the first property into radiation having a second property, wherein radiation having the first property that is generated by the radiation source is incident on a first face of said radiation converter, wherein an object to be imaged is locatable between the first face of the radiation converter and the imaging sensor, such an object thereby being back-lit by radiation having the second property emitted from the first face of the radiation converter. The vision machine may also include any one or more of the features of the apparatus according to the first and second aspects of the invention.

Also described herein is a vision machine that comprises an imaging camera for capturing images of an object, an ultraviolet light source that generates a beam of ultraviolet light, and a sheet of material having fluorescent properties and thereby converting ultraviolet light into light having a longer wavelength, wherein, in use, the beam of ultraviolet light is directed onto the sheet of material thereby generating light having a longer wavelength, the light having a longer wavelength being used to illuminate an object for imaging by the imaging camera.

Also described herein is vision machine apparatus comprising; an imaging sensor for imaging an object, a radiation source for generating radiation having a first property, a radiation converter for converting radiation having the first property into radiation having a second property, wherein the radiation source is arranged to project radiation having the first property onto the radiation converter thereby producing radiation having the second property, the radiation converter being arranged to illuminate an object to be imaged by the imaging sensor with radiation having the second property. Advantageously, an object to be imaged by the imaging sensor is locatable between the radiation converter and the imaging sensor. Such an object can thus be back-lit by radiation having the second property produced by the radiation converter. The vision machine apparatus may conveniently comprise a tool setter, CMM etc.

The invention will now be described, by way of example only, with reference to the accompanying drawings in which.

Figure 1:
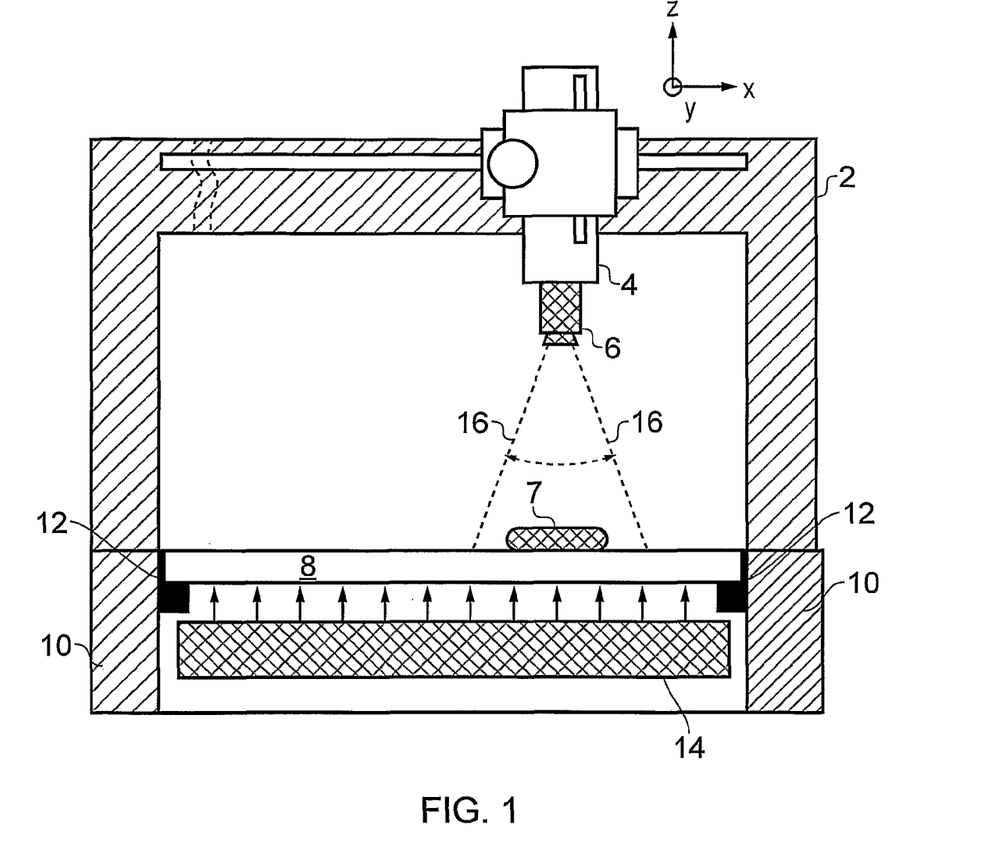
FIG. 1 illustrates a prior art vision machine implemented using a CMM.

Referring to FIG. 1, a prior art vision machine is illustrated. In particular, a bridge type (Cartesian) co-ordinate measuring machine 2 is provided that has a quill 4 that can be moved under computer control along three linear axes (x, y, z). The quill 4 carries a CCD camera 6 that is arranged to image an object 7 located on a transparent glass plate 8 provided at the base of the CMM. The glass plate 8 is attached to the frame 10 of the CMM via side supports 12. The object 7 is backlit by a planar backlight 14 located in the base of the CMM underneath the glass plate 8. Although the backlight 14 provides illumination across whole area of the glass plate 8, it is also known to provide a smaller backlight that is moved about in synchronisation with the quill 4 thereby only illuminating the region of the glass plate 8 in the locality of the CCD camera 6.

The backlit images acquired by the CCD camera 6 within its field of view 16 are passed to a computer (not shown) which runs known edge detection software to provide an accurate measure of the location of the edges of the object. Objects that are often measured in this manner include sheet metal parts, gaskets, seals, O-rings and small medical components. An example of such edge detection software includes the Aberlink Vision package supplied by Aberlink Ltd, Eastcombe, Stroud, UK.

A prior art vision machine of the type shown in FIG. 1 has a number of disadvantages. Firstly, the glass plate 8 of the base is only supported at the sides and hence needs to be sufficiently thick so as not to bend or break when an object is placed on it. For large area machines (e.g. a meter or more across) that measure large objects, providing a sufficiently thick glass plate can be very expensive and also adds greatly to the overall weight of the machine. Large area backlights for such machines are also expensive and pump significant amounts of heat into the CMM structure thereby reducing metrology performance. Although providing a moveable, small area, backlight mitigates the heating issue to some extent it adds extra complexity because a separate motorised system is required to move the backlight into the required position in synchronisation with quill movements.

Figure 2:
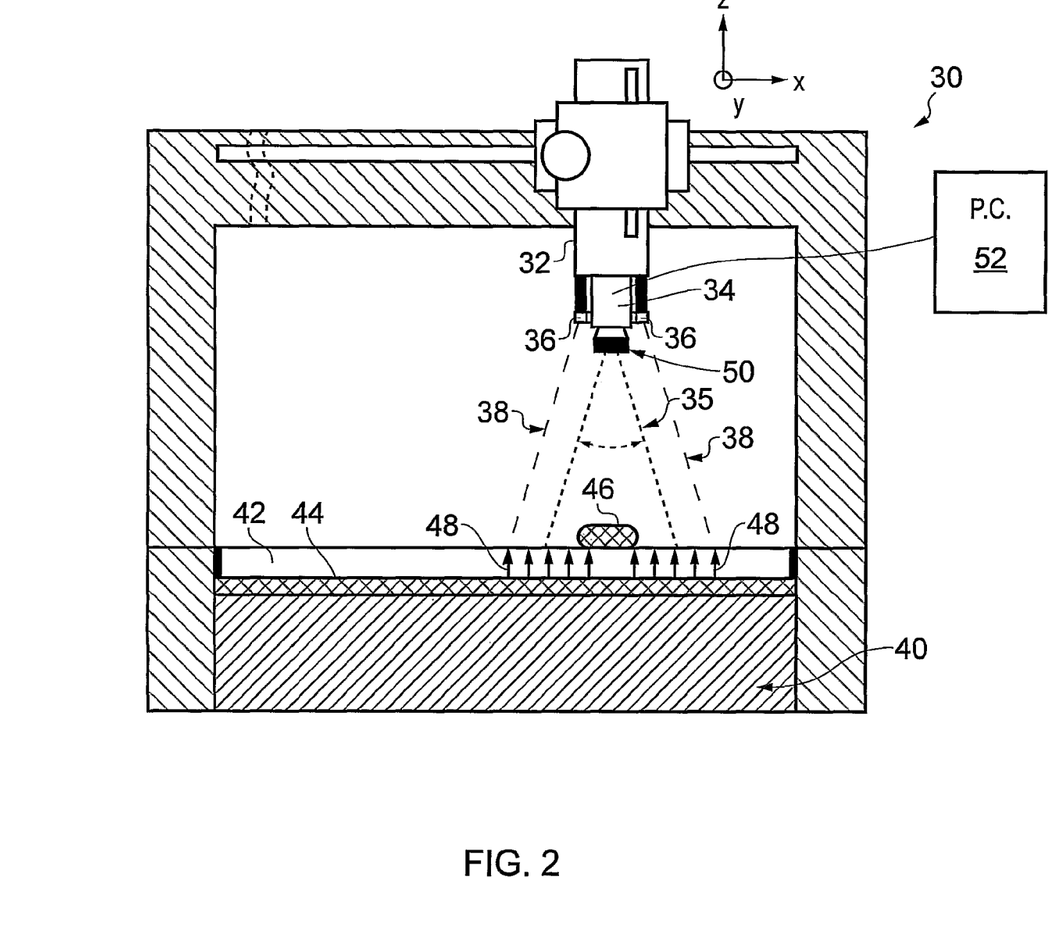
FIG. 2 illustrates a vision machine of the present invention.

Referring to FIG. 2, a vision machine of the present invention is illustrated. A bridge type (Cartesian) co-ordinate measuring machine 30 is again provided that has a quill 32 that can be moved under computer control along three linear axes (x, y, z). Mounted to the quill 32 is a CCD camera 34 for acquiring an image within its field of view 35 and a light source 36. The light source 36, which is described in more detail below with reference to FIG. 3, comprises a plurality of LEDs arranged in a ring centred about the CCD camera 34. The light source 36 includes a plurality of ultraviolet LEDs that project UV light within a light cone 38. The base of the CMM comprises a rigid metal support plate 40 and a glass member 42 that sandwich a layer of paper 44 which comprises a high level of fluorescent material or so-called optical brightness agents.

In use, the light source 36 directs UV light onto the base of the CMM in the vicinity of an object 46 to be imaged. The UV light passes though the glass member 42 and causes the paper 44 to fluoresce. The fluorescence process causes the UV light received by the paper 44 to be converted into (uncollimated) longer wavelength (blue) light 48 that is directed back through the glass member 42. This longer wavelength light 48 thus illuminates the object 46 from behind. In other words, the object 46 is backlit with the longer wavelength (blue) light 48.

The CCD camera 34 can thus acquire a backlit image of the object 46. In order to improve the signal-to-noise ratio of such an image, a UV filter 50 is mounted to the lens of the CCD camera 34. This UV filter is designed to block transmission of UV light (i.e. light of the wavelength emitted by the UV LEDs of the light source 36) but allow the transmission of the longer wavelength blue light 48 generated by the fluorescence process. In this manner, UV light that is reflected back from the object or glass member does not reach the CCD camera 34. As explained in more detail below with reference to FIG. 5, a software filter may also be used to reduce the affect of ambient light on the acquired images. Backlit images acquired by the CCD camera 34 are then passed to a computer 52 which runs known edge detection software and provides an accurate measure of the location of the edges of the object.

Figure 3:
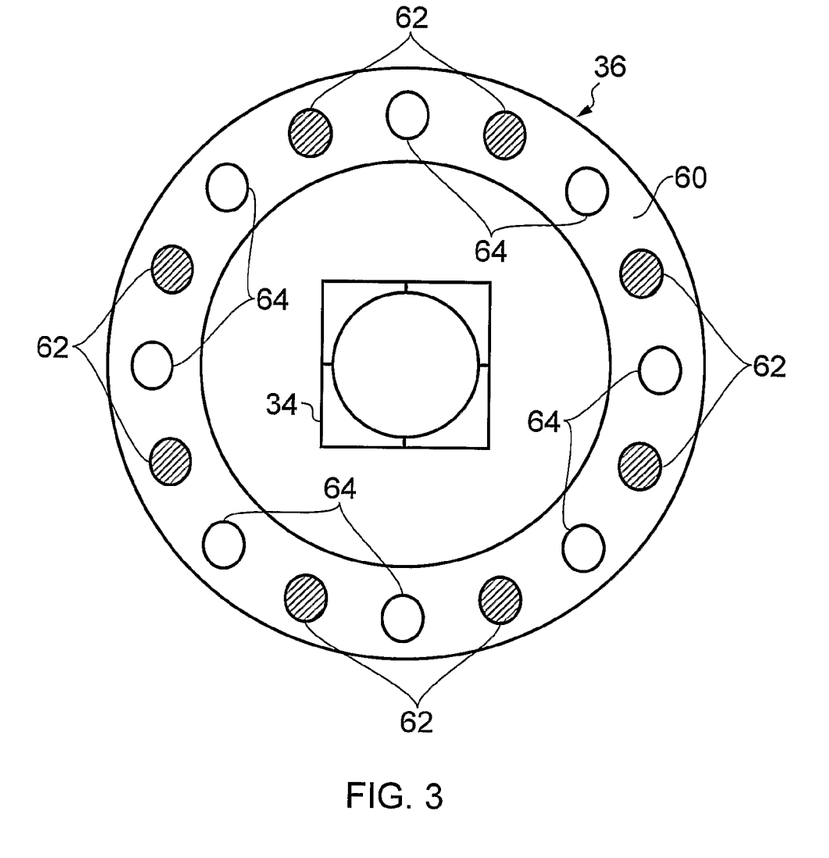
FIG. 3 shows a ring light source of the present invention.

Referring to FIG. 3, the light source 36 described with reference to FIG. 2 is shown in more detail. The light source 36 comprises an annular ring 60 that carries a plurality of UV LEDs 62. The UV LEDs 62 provide the UV light that is used to generate the blue (longer wavelength) backlighting. In addition to the UV LEDs 62, visible light (e.g. white) LEDs 64 may also be provided. The visible light LEDs 64 do not provide the above described fluorescence effect, but can be used if a front-lit image of the object is required or if it desired to illuminate the object for a user. The light source 36 thus provides the user with the option of acquiring front-lit or back-lit images simply by turning on the visible light LEDs 64 or the UV LEDs 62 respectively.

It would also be possible to provide a light source that comprises UV LEDs and LEDs of a different wavelength (e.g. red LEDs) that illuminate the object simultaneously. A filter, for example a software filter applied to colour images acquired from the camera 34, could then be used to extract backlit images (i.e. by analysing the blue light generated by the UV light) and/or front-lit image (i.e. by analysing the red light). In this manner, front-lit and back-lit images could be acquired simultaneously.

Figure 4:
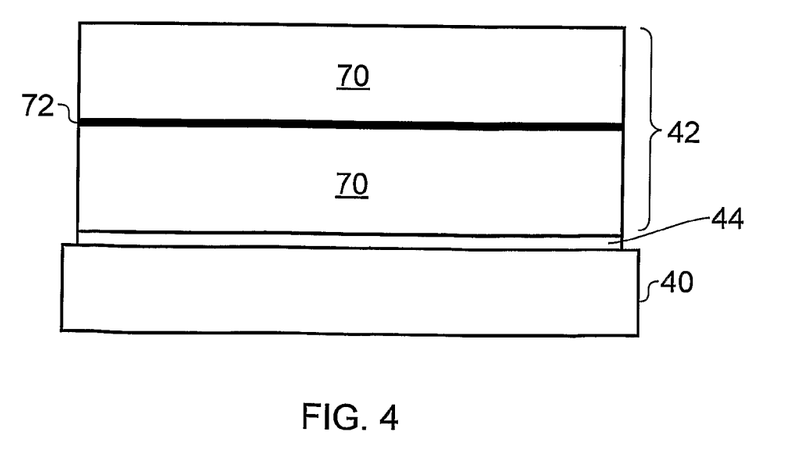
FIG. 4 illustrates a glass member having an integral diffuser.

Referring to FIG. 4, the base of the CMM illustrated in FIG. 2 is shown in more detail. In particular, FIG. 4 shows the glass member 42, the paper layer 44 and the rigid metal support plate 40. In this example, the glass member 42 comprises two layers of UV transparent glass 70 that sandwich a frosted, light diffusing, layer 72. To further reduce the area of the shadow that will be cast by the object, it is also preferred that the glass member 42 is quite thick. For example, the glass member 42 is preferably around 1-2 cm centimeters thick (e.g. 1.6 cm thick). It should be noted that this diffuser arrangement improves the spatial uniformity of the longer wavelength (blue) light 48 that is directed back towards the CCD camera 34 but is by no means essential. It would thus be possible for the glass member 42 to be replaced with a single sheet of glass.

Figure 5:
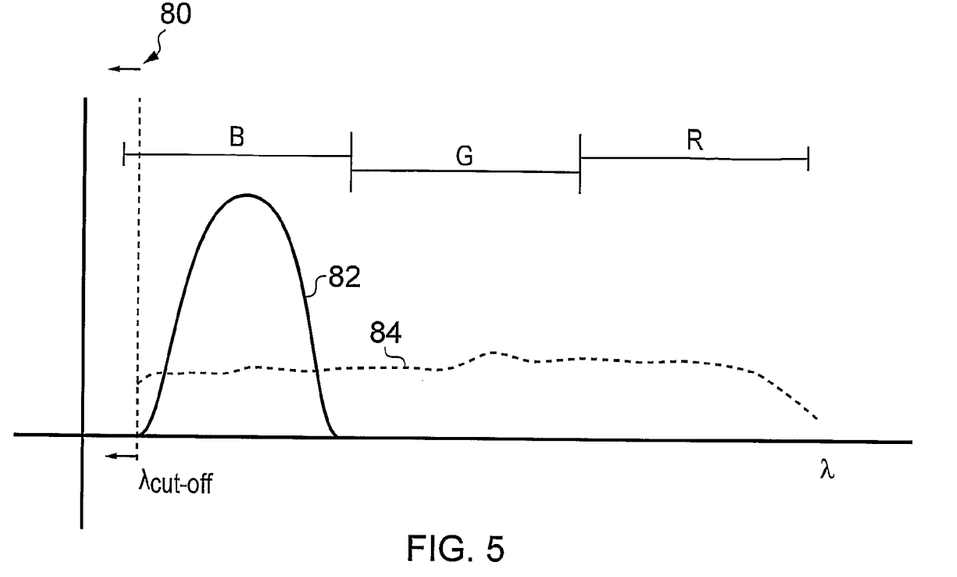
FIG. 5 illustrates the wavelength characteristics of light received by the image sensor, and FIG. 6 show a machine tool vision application of the present invention.

Referring to FIG. 5, the spectral composition of light that reaches the CCD camera 34 is schematically illustrated. The CCD camera 34 is a conventional colour camera and thus comprises a two-dimensional array of pixels, each pixel comprising red, green and blue sub-pixels. As illustrated in FIG. 5, these different sub-pixels are sensitive to light across defined wavelength ranges (R, G, B). The presence of the UV filter 50 ensures that any light below the cut-off wavelength 80 (which includes the UV light output by the light source 36) does not reach the CCD camera 34. In this example, a cut-off wavelength of 400 nm is used.

The longer wavelength (blue) light 48 generated by fluorescence has a wavelength spectra 82; it should be again noted that the spectra 82 is a schematic illustration only and the exact width and profile of the spectra will depend on the composition of the fluorescent material. Any ambient light is typically much more of a broadband composition as shown by spectra 84. An electronic filtering process is thus implemented by taking the intensity of light detected by each blue sub-pixel and subtracting from that the sum of half the intensity of light detected by the associated green and red sub-pixels. An intensity value that relates to the amount of longer wavelength (blue) light 48 is thus created for each pixel. This process, which is performed separately for each pixel using dedicated processing circuitry, results in an intensity map or image which may be displayed as a black and white image or intensity map. This image can then be analysed by known edge detection software in order to provide accurate object measurements.

It can be seen that the vision machine of the present invention provides many advantages over prior art devices. In particular, a complex backlighting system can be replaced with a layer of fluorescent material or the like. The radiation source may then be located away from the base of the CMM. This allows the complexity of the structure of the CMM base to be reduced. In particular, there is no need to provide large sheets of (necessarily) thick glass that are supported at the edges. Instead, such glass sheets may be supported across their width. The invention is particularly suited to retrofitting existing CMM systems; a glass member with an underlying fluorescent layer can simply be placed on an existing base rather than having to provide a whole new base structure.

Figure 6:
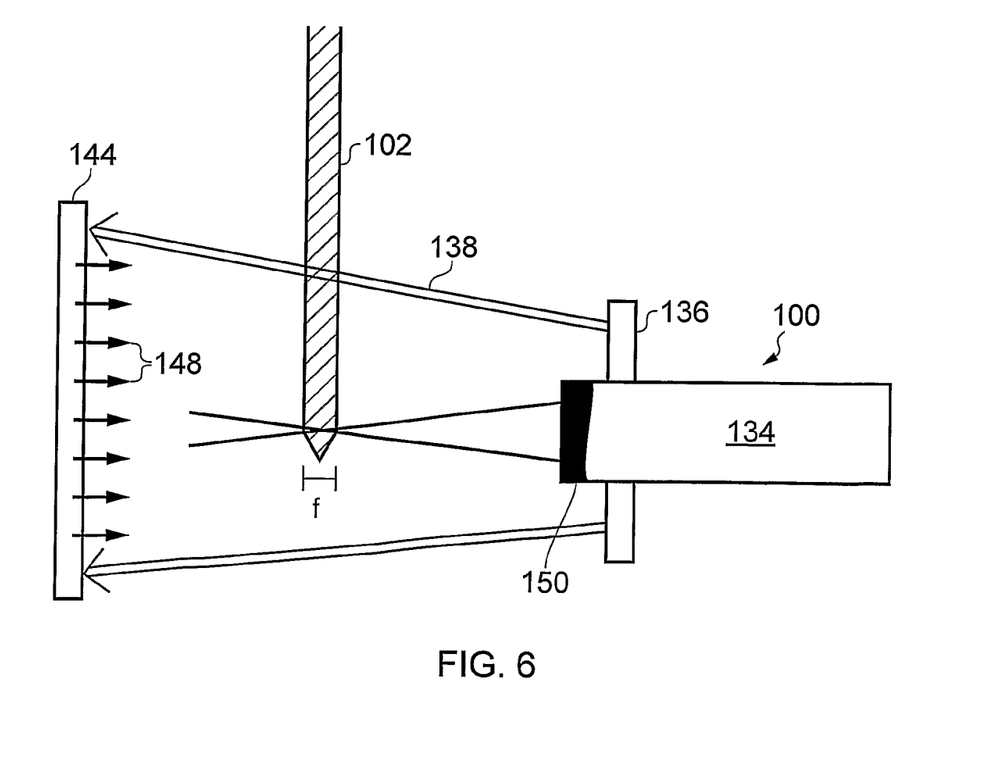

Referring to FIG. 6, a further example of the present invention is illustrated. In particular, FIG. 6 shows a tool setting device 100 that comprises a CCD camera 134 with an attached UV filter 150, a UV light source 136 and a layer of paper 144 that comprises fluorescent material. The CCD camera 134 and UV light source 136 are located together on a first side of a region in which a cutting tool 102 can placed. The layer of paper 144 (which may be coated in coolant resistant material) is located on the opposite side of the cutting tool region.

In a similar manner to that described above, a cone of UV light 138 is projected onto the layer of paper 144 by the UV light source 136. A fluorescence process in the paper produces longer wavelength (blue) light 148 that provides backlit illumination of the cutting tool 102. The CCD camera 134 is focussed to region f and is sensitive to the longer wavelength (blue) light 148 and thereby produces backlit images of the cutting tool 102. Edge detection processes may then be performed on such images to measure tool properties (e.g. the profile and/or position of cutting teeth etc).

The above examples are merely illustrative of the present invention. The skilled person would be aware of the many modifications and variants of the above examples that are encompassed by the present invention.

The invention claimed is:

1. A vision machine apparatus, comprising;
   an imaging sensor arranged to image an object,
   a radiation source arranged to generate radiation having a first property, and
   an object supporting base comprising (1) a radiation converter arranged to convert radiation having the first property into radiation having a second property, and (2) a member that is substantially transparent to radiation having the first property, is substantially transparent to radiation having the second property, comprises a glass member comprising two layers of glass and a light diffusing layer sandwiched between the two layers of glass, and has a lower surface to which the radiation converter is adjacent, wherein:
   the radiation source is arranged to project radiation having the first property through the member and onto the radiation converter, the radiation converter thereby producing radiation having the second property,
   the radiation converter is arranged to illuminate, with radiation having the second property, an object to be imaged by the imaging sensor that is separate from the vision machine apparatus,
   the object to be imaged is releasably locatable on an upper surface of the glass member arranged to support the object to be imaged, between the radiation converter and the imaging sensor, so as to be spaced from the radiation converter by the member, the object thus being back-lit by radiation having the second property produced by the radiation converter, and
   the radiation source is arranged to project radiation having the first property onto the object to be imaged and onto the radiation converter.

2. An apparatus according to claim 1, comprising a filter arranged to substantially prevent radiation having the first property from reaching the imaging sensor.

3. An apparatus according to claim 1, wherein the radiation source comprises one or more ultraviolet light emitting diodes.

4. An apparatus according to claim 1, wherein the radiation source comprises a plurality of light emitting diodes arranged in a ring, and wherein the imaging sensor is located at the centre of the ring.

5. An apparatus according to claim 1, wherein the radiation converter comprises fluorescent material, the radiation converter thereby converting light having a first wavelength property into light having a second wavelength property.

6. An apparatus according to claim 5, wherein the radiation converter comprises a sheet of paper comprising fluorescent material.

7. An apparatus according to claim 1, comprising a co-ordinate positioning machine having a quill that is moveable relative to the object supporting base, wherein the imaging sensor and the radiation source are both carried by the quill.

8. An apparatus according to claim 7, wherein the radiation source is arranged to project radiation having the first property onto at least the portion of the object supporting base that is within the field of view of the imaging sensor.

9. An apparatus according to claim 1, comprising a quill that carries the radiation source, wherein the radiation converter is provided across the active area of the object supporting base upon which the object may be placed, and wherein the radiation source illuminates only a part of the active area of the object supporting base at any one time.

10. An apparatus according to claim 1, wherein the object supporting base comprises a rigid base plate arranged to support the glass member, the radiation converter being sandwiched between the rigid base plate and the glass member.

11. An apparatus according to claim 1, wherein the imaging sensor comprises a colour camera.

12. An apparatus according to claim 11, comprising an image processor arranged to analyse images produced by the colour camera, wherein the image processor is arranged to electronically reduce the contribution to the images of ambient light.

13. An apparatus according to claim 1, comprising an edge detection analyser arranged to receive images from the imaging sensor, the edge detection analyser being arranged to detect the position of any object edges in the received images.

14. An apparatus according to claim 1, wherein the radiation converter is substantially planar and has a first face, radiation from the radiation source being incident on the first face and radiation having the second property emitted from the first face being arranged to illuminate the object to be imaged.

15. An apparatus according to claim 1, wherein the thickness of the member is greater than the thickness of the radiation converter.

16. An apparatus according to claim 1, wherein the member has a thickness greater than 0.5 cm.

17. An apparatus according to claim 1, wherein the member comprises a diffuser layer.

18. A vision machine apparatus, comprising;
an imaging sensor arranged to image an object;
a radiation source arranged to generate radiation having a first property;
a radiation converter arranged to convert radiation having the first property into radiation having a second property; and
a member that is substantially transparent to radiation having the first property and to radiation having the second property, the member comprising two layers of glass and a light diffusing layer sandwiched between the two layers of glass,
wherein radiation having the first property that is generated by the radiation source passes through the member and is incident on a first face of the radiation converter, and
wherein an object to be imaged is supported by the member in a location between the first face of the radiation converter and the imaging sensor so as to be spaced from the radiation converter by the member, the object thereby being back-lit by radiation having the second property emitted from the first face of the radiation converter.

* * * * *